(12) United States Patent
Liu et al.

(10) Patent No.: US 11,775,832 B2
(45) Date of Patent: *Oct. 3, 2023

(54) DEVICE AND METHOD FOR ARTIFICIAL NEURAL NETWORK OPERATION

(71) Applicant: Shanghai Cambricon Information Technology Co., Ltd., Pudong New Area (CN)

(72) Inventors: Shaoli Liu, Pudong New Area (CN); Yifan Hao, Pudong New Area (CN); Yunji Chen, Pudong New Area (CN); Qi Guo, Pudong New Area (CN); Tianshi Chen, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/444,443

(22) Filed: Jun. 18, 2019

(65) Prior Publication Data
US 2019/0311266 A1 Oct. 10, 2019

Related U.S. Application Data

(63) Continuation-in-part of application No. PCT/CN2017/118124, filed on Dec. 22, 2017.

(30) Foreign Application Priority Data

Dec. 23, 2016 (CN) .......................... 201611214028.0

(51) Int. Cl.
*G06N 3/082* (2023.01)
*G06F 17/16* (2006.01)
*G06N 3/04* (2023.01)

(52) U.S. Cl.
CPC ............ *G06N 3/082* (2013.01); *G06F 17/16* (2013.01); *G06N 3/04* (2013.01); *G06F 2207/4824* (2013.01)

(58) Field of Classification Search
CPC .......... G06N 3/082; G06N 3/04; G06F 17/16; G06F 2207/4824
See application file for complete search history.

(56) References Cited

U.S. PATENT DOCUMENTS 10,332,592 B2 * 6/2019 Strachan ................ G11C 11/419
2013/0138589 A1 * 5/2013 Yu ............................ G06N 3/08
706/25

(Continued)

FOREIGN PATENT DOCUMENTS

CN 105512723 A 4/2016

OTHER PUBLICATIONS

Jiantao Qiu, Jie Wang, Song Yao, Kaiyuan Guo, Boxun Li, Erjin Zhou, Jincheng Yu, Tianqi Tang, Ningyi Xu, Sen Song, Yu Wang, and Huazhong Yang, "Going Deeper with Embedded FPGA Platform for Convolutional Neural Network", Feb. 21, 2016, FPGA'16, pp. 26-35. (Year: 2016).*

(Continued)

*Primary Examiner* — Ying Yu Chen
(74) *Attorney, Agent, or Firm* — Getech Law LLC; Jun Ye

(57) ABSTRACT

Aspects of data modification for neural networks are described herein. The aspects may include a data modifier configured to receive input data and weight values of a neural network. The data modifier may include an input data configured to modify the received input data and a weight modifier configured to modify the received weight values. The aspects may further include a computing unit configured (Continued)

to calculate one or more groups of output data based on the modified input data and the modifier weight values.

17 Claims, 10 Drawing Sheets

(56) References Cited

U.S. PATENT DOCUMENTS

| | | | | |
|---|---|---|---|---|
| 2016/0026912 | A1* | 1/2016 | Falcon | G06N 3/0454 706/25 |
| 2016/0174902 | A1* | 6/2016 | Georgescu | G06T 7/73 600/408 |
| 2018/0046903 | A1* | 2/2018 | Yao | G06N 3/0481 |
| 2019/0188567 | A1* | 6/2019 | Yao | G06N 3/04 |

OTHER PUBLICATIONS

Antonello Pasini, "Artificial neural networks for small dataset analysis", 2015, J Thorac Dis 2015;7(5), pp. 953-960. (Year: 2015).*
Song Han, Jeff Pool, John Tran, and William J. Dally. "Learning both Weights and Connections for Efficient Neural Networks", Oct. 30, 2015, arXiv, p. 1-9. (Year: 2015).*
Song Han, Huizi Mao, and William J. Dally, "Deep Compression: Compressing Deep Neural Networks with Pruning, Trained Quantization, and Huffman Coding", Feb. 15, 2016, arXiv, pp. 1-14. (Year: 2016).*
Zhang et al., "Cambricon-X: An Accelerator for Sparse Neural Networks", Oct. 2016, 2016 49th Annual IEEE/ACM International Symposium on Microarchitecture (MICRO), pp. 1-12. (Year: 2016).*
Chen, et al., "A Small-Footprint Accelerator for Large-Scale Neural Networks", ACM Transactions on Computer Systems, vol. 33, No. 2, Article 6, May 2015, 27 pages.
Du, et al., "An Accelerator for High Efficient Vision Processing", IEEE Transactions on Computer-aided Design of Integrated Circuits and System, vol. 36, No. 2, Feb. 2017, pp. 227-240.
Liu, et al., "Cambricon: An Instruction Set Architecture for Neural Networks", 2016 ACM/IEEE 43rd Annual International Symposium on Computer Architecture, Oct. 12, 2016, pp. 393-405.
Zhang, et al., "Cambricon-X" An Accelerator for Sparse Neural Networks, The 49th Annual IEEE/ACM International Symposium on Microarchitecture Article No. 20, Oct. 15, 2016, 12 pages.
Chen, et al., "DaDianNao: A Machine-Learning Supercomputer", 2014 47th Annual IEEE/ACM International Symposium on Microarchitecture, Dec. 13, 2014, pp. 609-622.
Luo, et al., "DaDianNao: A Neural Network Supercomputer", IEEE Transaction on Computers, vol. 66, No. 1, Jan. 2017, pp. 73-88.
Chen, et al., "DianNao: A Small-Footprint High-Throughput Accelerator for Ubiquitous Machine-Learning", ASPLOS 14, Proceedings of the 19th international conference on Architectural Support for Programming Languages and Dperating Systems, Mar. 1-5, 2014, pp. 269-283.

Chen, et al., "DianNao Family: Energy-Efficient Hardware Accelerators for Machine Learning", Communications of he ACM, vol. 59, No. 11, Nov. 2016, pp. 105-112.
Liu, et al., "PuDianNao: A Polyvalent Machine Learning Accelerator", ASPLOS '15 Proceedings of the Twentieth International Conference on Architectural Support for Programming Languages and Operating Systems, Mar. 14-18, 2015, pp. 369-381.
Du, et al., "ShiDianNao: Shifting Vision Processing Closer to the Sensor", ISCA '15 Proceedings of the 42nd Annual International Symposium on Computer Architecture, Jun. 13-17, 2015, pp. 92-104.
PCT/CN2017/118124—International Search Report, dated Mar. 22, 2018, 8 pages, (no English translation).
Huanlong, et al., "New Neural Network Pruning Algorithm Structure Feedforward", Dec. 2013, 11 pages.
Jun, et al., "Dynamic Optimization Structure Design for Neural Networks: Review and Perspective", Mar. 2010, 21 pages.
201711414596.X—Office Action, dated Aug. 7, 2019, 7 pages, (no English translation).
201711418273.8—Office Action, dated Aug. 13, 2019, 7 pages, (no English translation).
EP 17883465.1—Communication Pursuant to Article 94(3) EPC, dated Jul. 24, 2020, 6 pages.
EP 17883465.1—Summons to Attend Oral Proceedings Pursuant to Rule 115(1) EPC, dated Mar. 11, 2021, 10 pages.
Balestrassi, et al., "Design of Experiments on Neural Network's Training for Nonlinear Time Series Forecasting", Neurocomputing, 2009,19 pages.
Wang, et al., "Genetic Neural Network and Application in Welding Robot Error Compensation", Proceedings of the Fourth International Conference on Machine Learning and Cybernetics, Guangzhou, Aug. 2005, 6 pages.
Han, et al., "Learning Both Weights and Connections for Efficient Neural Networks", Oct. 30, 2005, 9 pages. https://arxiv.org/pdf/1506.02626.pdf.
EP 17883465.1—Response to Communication pursuant to Article 94(3) EPC dated Oct. 5, 2020, filed Jan. 27, 2021, 8 pages.
CN 201711414596.X—Second Office Action, dated Nov. 18, 2019, 5 pages. (with brief English explanation).
CN 201711418273.8—Second Office Action, dated Nov. 13, 2019, 4 pages. (with brief English explanation).
PCT/CN2016/111737—International Search Report, dated Sep. 27, 2017, 14 pages. (with brief English explanation).
Sun, Huan-Long, etl al., "A New Pruning Algorithm for Feedforward Neural Network", College of Computer & Information Engineering, Guangxi Teachers Education University, Nanning, China, vol. 30, No. 4, Dec. 2013. (with semi-English translation).
Qiao, Jun-Fei, et al., "Dynamic Optimization Structure Design for Neural Networks: Review and Perspective", College of Electronic and Control Engineering, Beijing University of Technology, Beijing, China, vol. 27, No. 3, Mar. 2010, 10 pages. (with brief English translation).
CN202010147545.0—First Office Action dated Mar. 15, 2023, 11 pages. (With Brief English Explanation).

* cited by examiner

DEVICE AND METHOD FOR ARTIFICIAL NEURAL NETWORK OPERATION

BACKGROUND

Artificial Neural Networks (ANNs), or Neural Networks (NNs) for short, are algorithmic mathematical models imitating the behavior characteristics of animal neural networks and performing the distributed concurrent information processing. Depending on complexity of a system, such networks adjust interconnection among a great number of internal nodes, thereby achieving the purpose of information processing. The algorithm used by NNs may be vector multiplication (also referred as "multiplication") and convolution, which widely adopts sign functions and various approximations thereof.

As neural networks in animal brains, NNs consist of multiple interconnected nodes. As shown in FIG. 3, each block represents a node and each arrow represents a connection between two nodes.

The calculation formula of a neuron can be briefly described as $y=f(\Sigma_{i=0}^{n} w_i * x_i)$, wherein x represents input data received at all input nodes connected to the output nodes, w represents corresponding weight values between the input nodes and the output nodes, and f(x) is a nonlinear function, usually known as an activation function including those commonly used functions such as $$\frac{1}{1+e^{-x}} \text{ and } \frac{e^x - e^{-x}}{e^x + e^{-x}}.$$

NNs are widely applied to a variety of applications, such as computer vision, voice recognition and natural language processing. In recent years, the scale of NNs has been growing. For example, in 1998, Lecun's neural network for handwriting characters recognition includes less than 1M weight values; while in 2012, Krizhevsky for participating ImageNet competition includes 60M weight values.

NNs are applications that require large amounts of calculation and great bandwidth for memory access. The more weight values, the more amounts of calculation and memory access are required. In order to decrease the account of calculation and the number of weight values thereby reducing memory access, a sparsely connected neural network may be implemented.

Even as the amount of calculation and the amount of memory access of NNs dramatically increase, a general-purpose processor is conventionally adopted to calculate a sparse artificial neural network. With regard to the general-purpose processor, the input neurons, output neurons and weight values are respectively stored in three arrays, meanwhile there is an index array for storing the connection relation between each output neuron and input neuron connected by weight values. At the time of calculating, a major operation is a multiplication of input data and a weight value. Each calculation needs to search a weight value corresponding to the input data through the index array. Since the general-purpose processor is weak in both calculation and memory access, demands of NNs may not be satisfied. Nevertheless, when multiple general-purpose processors work concurrently, inter-processor communication becomes a performance bottleneck again. In some other respects, when calculating a neural network after pruning, each multiplication operation needs to re-search positions corresponding to the weight values in the index array, which increases additional calculation amounts and memory access overhead. Thus, NNs calculation is time-consuming and power consuming. General-purpose processors need to decode an operation of a multiple-layer artificial neural network into a long sequence of operations and memory access instructions, and front-end decoding brings about a larger overhead.

Another known method to support the operations and training algorithms of a sparsely connected artificial neural network is to use a graphics processing unit (GPU). In such method a general-purpose register file and a general-purpose stream processing unit are used to execute a universal Single-instruction-multiple-data (SIMD) instruction to support the aforementioned algorithm. Since a GPU is a device specially designed for executing graph and image operations as well as scientific calculation, it fails to provide specific support for sparse artificial neural network operations. As such, GPUs also need a great amount of front-end decoding to execute sparse artificial neural network operations, thus leading to additional overheads. In addition, since GPU only contains relatively small on-chip caching, then model data (e.g., weight values) of a multiple-layer artificial neural network has to be repeatedly retrieved from outside the chip. Thus, off-chip bandwidth becomes a main performance bottleneck while producing huge power consumption.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example neural network acceleration processor. The example neural network acceleration processor may include a data modifier configured to receive one or more groups of input data, one or more weight values, and one or more connection values. The data modifier may include an input data modifier configured to modify the one or more groups of input data and a weight modifier configured to modify the one or more weight values. The example neural network acceleration processor may further include a computing unit configured to calculate one or more groups of output data based on the modified input data and the modified weight values.

Another example aspect of the present disclosure provides an example method for modifying data for neural networks. The example method may include receiving, by a data modifier, one or more groups of input data, one or more weight values, and one or more connection values; modifying, by an input data modifier of the data modifier, the one or more groups of input data; modifying, by a weight modifier of the data modifier, the one or more weight values; and calculating, by a computing unit, one or more groups of output data based on the modified input data and the modified weight values.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or," which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding of the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

A typical conceptual model of a multi-layer neural network (MNN) may include multiple layers of neurons. Each neuron is an information-processing unit that is fundamental to the operation of a neural network. In more detail, a typical model of a neuron may include three basic elements, e.g., a set of synapses, an adder, and an activation function. In a form of a mathematical formula, the output signals of a neuron may be represented as $y_k = \varphi(\Sigma_{j=1}^{m} w_{kj} x_j + b_k)$, in which $y_k$ represents the output signals of the neuron, $\varphi(\ )$ represents the activation function, $w_{kj}$ represents one or more weight values, $x_1$ represents the input signals of the neuron, and $b_k$ represents a bias value. In other words, a simplified model of a neuron may include one or more input nodes for receiving the input signals or data and an output node for transmitting the output signals or data to an input node of another neuron at the next level. Thus, a layer of neurons may at least include a layer of multiple input nodes and another layer of output nodes.

Figure 1:
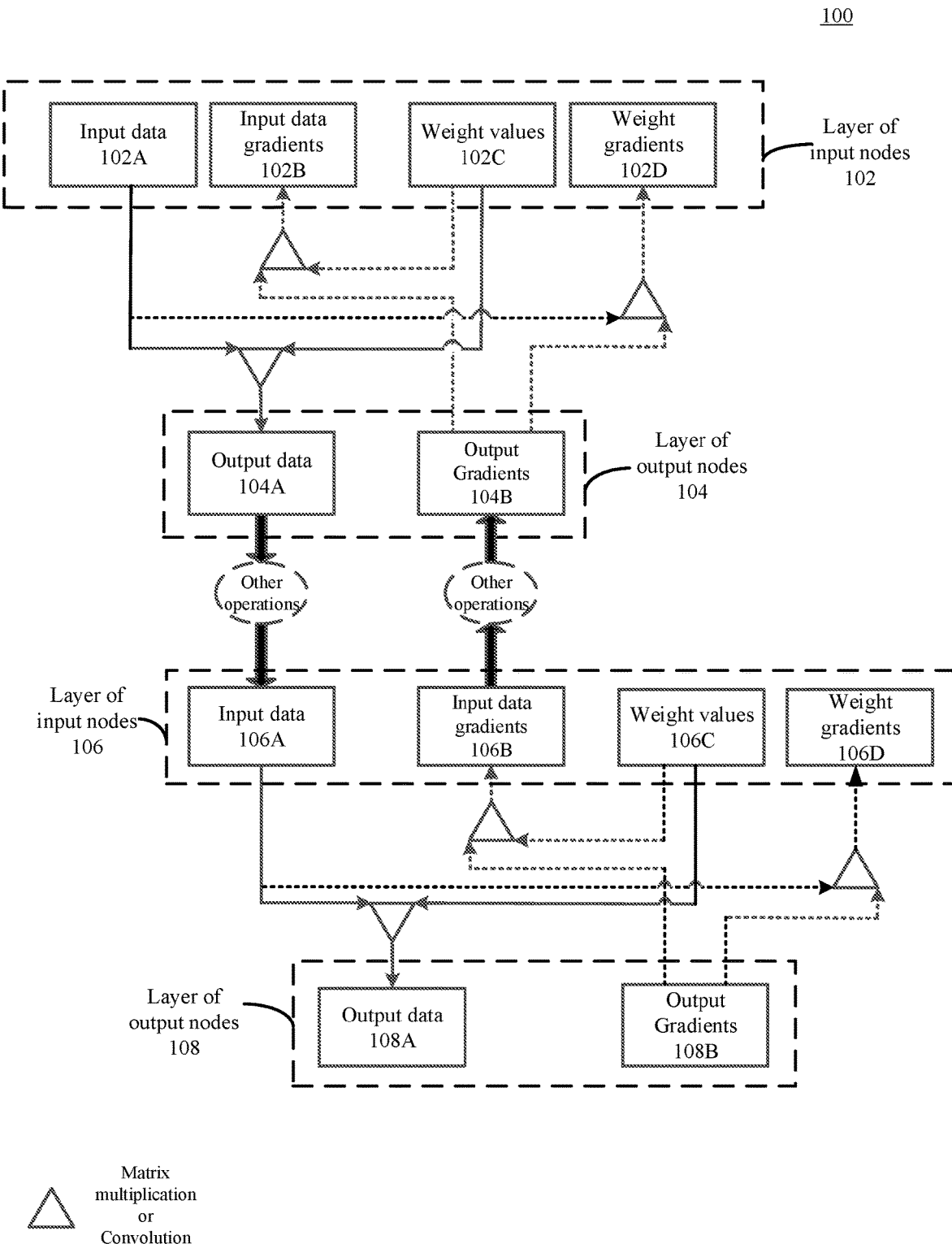
FIG. 1 is a block diagram illustrating an example computing process at an MNN acceleration processor for neural networks.

FIG. 1 is a block diagram illustrating an example computing process 100 at an MNN acceleration processor for neural networks. As depicted, the example computing process 100 may be performed by a layer of input nodes 102, a layer of output nodes 104, a layer of input nodes 106, and a layer of output nodes 108. A triangular-shaped operator (A as shown in FIG. 1) may indicate a matrix multiplication or a convolution operation. It is notable that the layers of input nodes and output nodes may not be the first layer and the last layer of the entire neural network in the process. Rather, the layers of input and output nodes may refer to the nodes included in any two consecutive layers of neurons of a neural network. As described below in greater detail, the computing process from the layers of input nodes 102 to the layer of output nodes 108 may be referred to as a forward propagation process; the computing process from the layer of output nodes 108 to the layer of input nodes 102 may be referred to as a backward propagation process.

The forward propagation process may start from one or more input nodes that receive input data 102A. The received input data 102A may be multiplied or convolved by one or more weight values 102C. The results of the multiplication or convolution may be transmitted to one or more output nodes at the layer of output nodes 104 as output data 104A. The output data 104A, with or without further operations, may be transmitted to one or more input nodes at the next layer (e.g., the layer of input nodes 106) as input data 106A. Similarly, the input data 106A may be multiplied or convolved by one or more weight values 106C. The results of the multiplication or convolution may be similarly transmitted to one or more output nodes at the layer of output nodes 108 as output data 108A.

The backward propagation process may start from one or more output nodes at the last layer of nodes of the forward propagation process (e.g., the layer of output nodes 108). For example, output gradients 108B generated at the layer of output nodes 108 may be multiplied or convolved by the input data 106A to generate weight gradients 106D at the layer of input nodes 106. The output gradients 108B may be further multiplied or convolved by the weight values 106C to generated input data gradients. The input data gradients 106B, with or without other operations between layers, may be transmitted to one or more nodes at the layer of output nodes 104 as output gradients 104B. The output gradients 104B may then be multiplied or convolved by the input data 102A to generate weight gradients 102D. Additionally, the output gradients 104B may be multiplied by the weight values 102C to generate input data gradients 102B.

Figure 2:
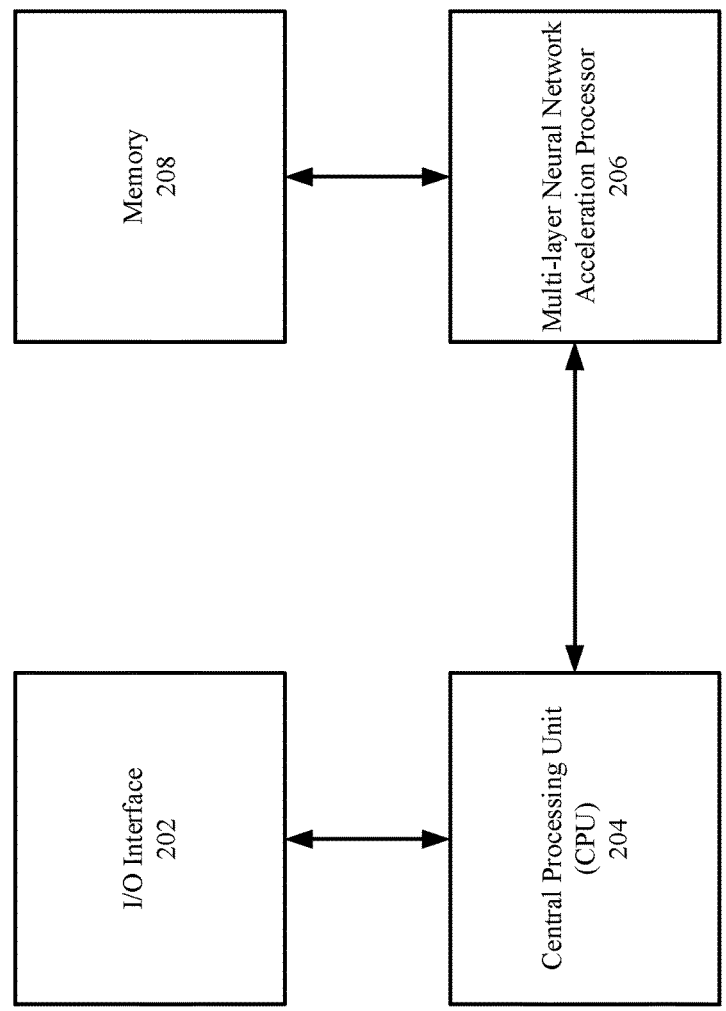
FIG. 2 is a block diagram illustrating an example computer system in which data modification for neural networks may be implemented.

FIG. 2 is a block diagram illustrating an example computer system 200 in which data modification for neural networks may be implemented. The example computer system 200 may include at least an I/O interface 202, a central processing unit (CPU) 204, a multi-layer neural network acceleration processor 206, and a memory 208. The I/O interface 202 may be configured to exchange data or information with peripheral devices, e.g., input devices, storage devices, etc. Data received from the I/O interface 202 may be further processed at the CPU 204. Data that require processing at an MNN may be transmitted to the MNN acceleration processor 206. For example, the forward propagation process and the backward propagation process described above in accordance with FIG. 1 may be performed at the MNN acceleration processor 206. Other data for the forward propagation process and the backward propagation process, e.g., weight values 102C and 106C, may be retrieved from the memory 208 and stored on the MNN acceleration processor 206 during the processes. However, as discussed above, the index array that indicates the correspondence between the input data and the weight values is conventionally stored on the memory 208. At each multiplication or convolution that involves the weight values, retrieving the index array from the memory 208 may cause significant system delays or bandwidth consumption. The MNN acceleration processor 206 may be described in further detail below.

Figure 3:
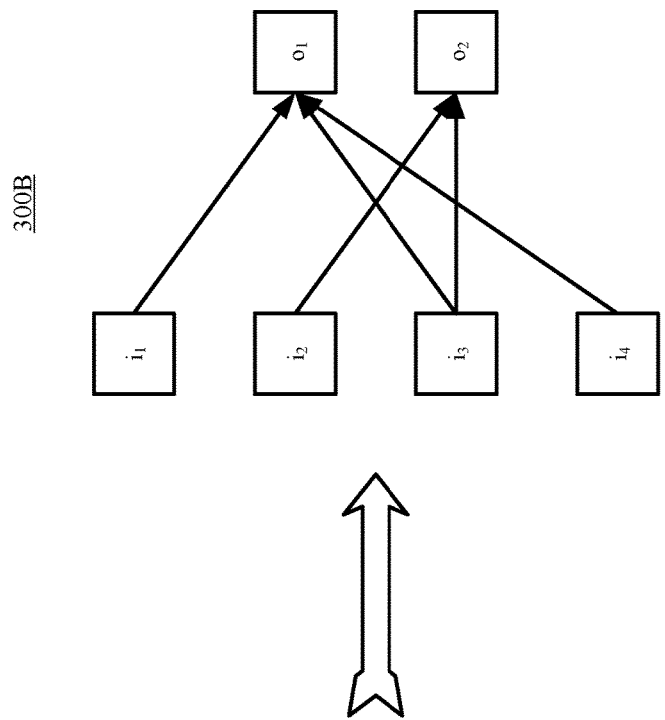
FIG. 3 is a diagram illustrating a comparison between a regular MNN and a sparse MNN in which data modification for neural networks may be implemented.
Figure 3:
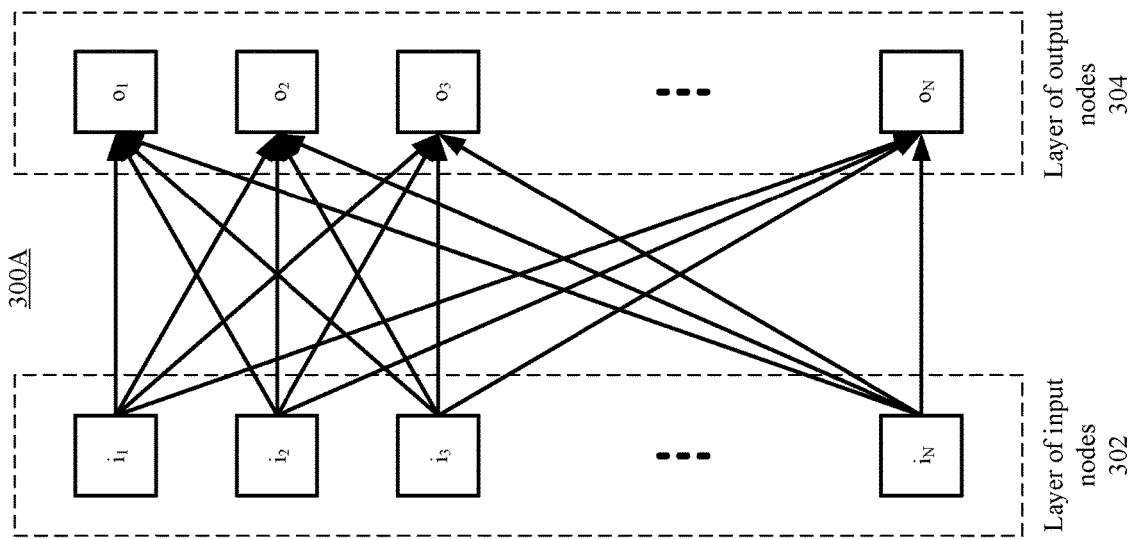

FIG. 3 is a diagram illustrating a comparison between a regular MNN 300A and a sparse MNN 300B in which data modification for neural networks may be implemented. As depicted, the regular MNN 300A may include a layer of input nodes 302 and a layer of output nodes 304. Each block shown in the regular MNN 300A indicates an input node or an output node. The arrows between the input nodes (e.g., $i_2$, $i_3 \ldots i_N$) and the output nodes (e.g., $o_1, o_2, o_3 \ldots o_N$) indicate those non-zero weight values for calculating the output data. For example, $w_{11}$ may be the weight value for calculating the output data at output node of based on the input data received at input node $i_1$. However, in some applications of neural networks, more than one of the weight values may be zero, in which case input data received at more than one input nodes are not considered for calculating some output data. In these cases, the arrows between corresponding input nodes and output nodes will be deleted and the MNN may be referred to as a sparse MNN, e.g., sparse MNN 300B. As shown in the sparse MNN 300B, no arrow is between $i_2$ and $o_1$, $i_1$ and $o_2$, and $i_4$ and $o_2$, which indicates that the weight values, $w_{21}$, $w_{12}$, and $w_{42}$ are zero.

Figure 4B:
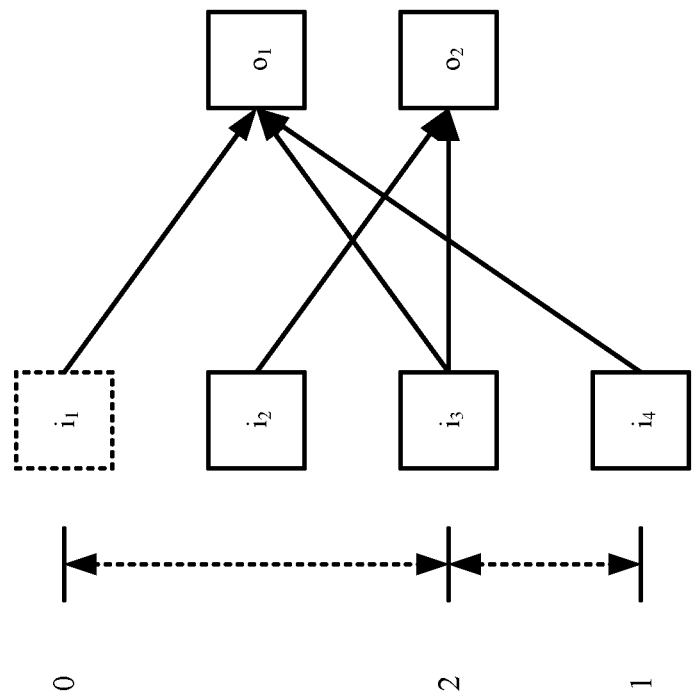
FIG. 4A and FIG. 4B are diagrams illustrating one or more connection values in a sparse MNN in which data modification for neural networks may be implemented.
Figure 4A:
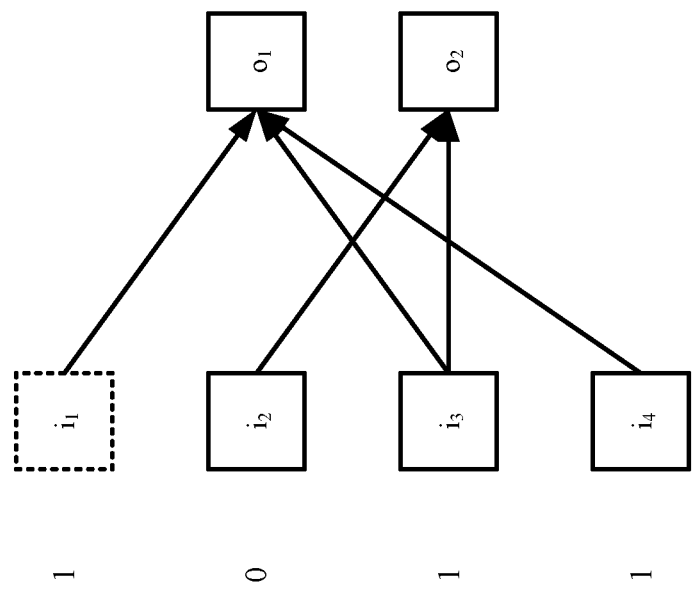

FIG. 4A and FIG. 4B are diagrams illustrating one or more connection values in a sparse MNN in which data modification for neural networks may be implemented. As discussed above, an index array that indicates the correspondence between the weight values and the input data is conventionally stored in the memory 208. With respect to sparse MNNs, connection data that indicate the correspondence between the output data and the input data may be generated and transmitted to the MNN acceleration processor 206.

As depicted in FIGS. 4A and 4B, one or more groups of input data may be received at the input nodes $i_1$, $i_2$, $i_3$, and $i_4$. In other words, input data may be received and stored in a form of input array that includes elements identified by array indexes $i_2$, $i_3$, and $i_4$. Similarly, one or more groups of output data may be generated at output nodes $o_1$ and $o_2$. That is, the output data may be stored and transmitted in a form of output array that include elements identified by array indexes $o_1$ and $o_2$. As an example of a sparse MNN, some input nodes are not connected to the output nodes.

Connection data including one or more connection values may be initialized and later modified based on the weight values corresponding to an output node and an input node. That is, if an absolute value of a weight value is greater than a first threshold value, a connection value for the corresponding output node and input node may be set to one. Otherwise, if a weight value corresponding to the output node and input node is zero, or the absolute value of the weight value is less than or equal to the first threshold value, the connection value for the corresponding output node and input node may be modified to zero.

For example, the weight values for calculating output data at output node $o_1$ may include $w_{11}$, $w_{21}$, $w_{31}$, and $w_{41}$, which respective corresponds to the input data received at input nodes $i_1$, $i_2$, $i_3$, and $i_4$. The weight values ($w_{11}$, $w_{21}$, $w_{31}$, and $w_{41}$) may be 0.5, 0, 0.6, and 0.8 and the first threshold value may be set to 0.3. Thus, absolute values of the weight values $w_{11}$, $w_{31}$, and $w_{41}$ are greater than the first threshold value but the absolute value of the weight value $w_{21}$ is not. As such, the connection values for $i_1$ and $o_1$, $i_3$ and $o_1$, $i_4$ and $o_1$ may be modified to 1 and the connection value for $i_2$ and $o_1$ may be modified to zero. Similarly, the connection values for $i_1$ and $o_2$ and $i_4$ and $o_2$ may be set to zero and the connection values for $i_2$ and $o_2$ and $i_3$ and $o_2$ may be set to one. Thus, the connection values for $o_1$ may be determined and stored to be (1, 0, 1, 1) and the connection values for $o_2$ may be determined to be (0, 1, 1, 0).

In some other examples, the connection values may be modified based on the input data. That is, if an absolute value of a group of input data at an input node is less than or equal to a second threshold value, a connection value corresponding to the group of input data may be set to zero. For example, the dash-lined block $i_1$ in FIG. 4A may indicate that the absolute value of the input data at $i_1$ (e.g., 0) is less than or equal to the second threshold value. The connection value corresponding to $i_1$ may be set to zero. Thus, the connection values for $o_1$ may be further modified to be 0011.

In other examples (e.g., illustrated in FIG. 4B), connection values may be generated based on a distance between the input nodes. A connection value may be determined by the distances between different input nodes that correspond to those weight values, of which the absolute values are equal to or less than the first threshold value. With respect to the above example weight values, $w_{11}$, $w_{31}$, and $w_{41}$, of which the absolute values are greater than the first threshold value, the connection value for input node $i_1$ may be set to a value equal to the distance between the first input node and the current input node. Thus, since the distance between input node $i_1$ and the first node (also $i_1$ here) is zero, the connection value for $i_1$ may be set to zero. With respect to input node $i_3$, since the distance between input node $i_3$ and the first input node ($i_1$) is 2, the connection value for $i_3$ may be set to 2. Thus, the connection values may be modified from 0111 to 021. It is notable that the illustration and the term "distance" are provided for purpose of brevity. Since the input data and the output data may be stored in a form of data array, the term "distance" may refer to the difference between array indexes. In some examples, the connection values may be stored in a form of a linked list or a multi-dimensional dynamic array.

The connection values, in some other examples, may be further modified based on the input data. That is, a connection value that corresponds to a group of input data, of which the absolute value is equal to or less than the second threshold value, may be deleted. For example, the connection value corresponds to the input data $i_1$ may be deleted. Thus, the connection values for $o_1$ may be further modified from 021 to 21.

Thus, as the connection values sufficiently represent the connections between the input nodes and the output nodes, the MNN acceleration processor 206 is not required to retrieve the index array from the memory 208 during the forward propagation process and the backward propagation process described in FIG. 1.

Figure 5:
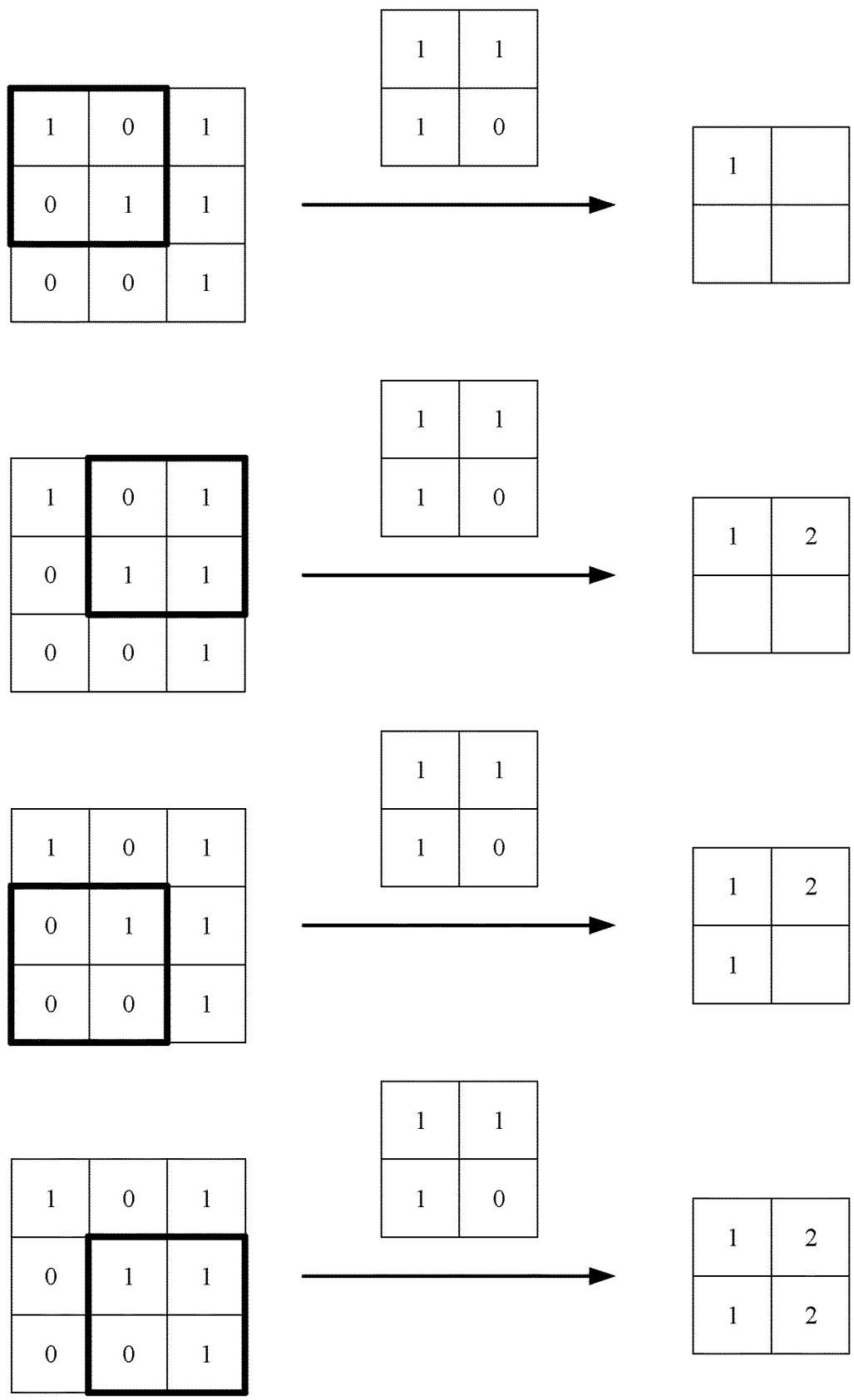
FIG. 5 is a diagram illustrating a convolution process with which data modification for neural networks may be implemented.

FIG. 5 is a diagram illustrating a convolution process with which data modification for neural networks may be implemented. In this example, an example convolution process between one or more groups of input data in a form of an input matrix $$\begin{matrix} 1 & 0 & 1 \\ 0 & 1 & 1 \\ 0 & 0 & 1 \end{matrix}$$

and weight values in a form of a weight matrix $$\begin{matrix} 1 & 1 \\ 1 & 0 \end{matrix}$$

is described. As shown, each element of the output matrix is calculated by convolving a portion of the input matrix with the weigh matrix. For example, the output data at the output node $o_1$ may be calculated by convolving the top left portion of the input matrix $$\left(\text{i.e.,} \begin{matrix} 1 & 0 \\ 0 & 1 \end{matrix}\right)$$

by the weight matrix. The result of the convolution process may be stored in an output matrix $$\left(\text{e.g.,} \begin{matrix} 1 & 2 \\ 1 & 2 \end{matrix} \text{ as shown}\right).$$

as shown).

Figure 6:
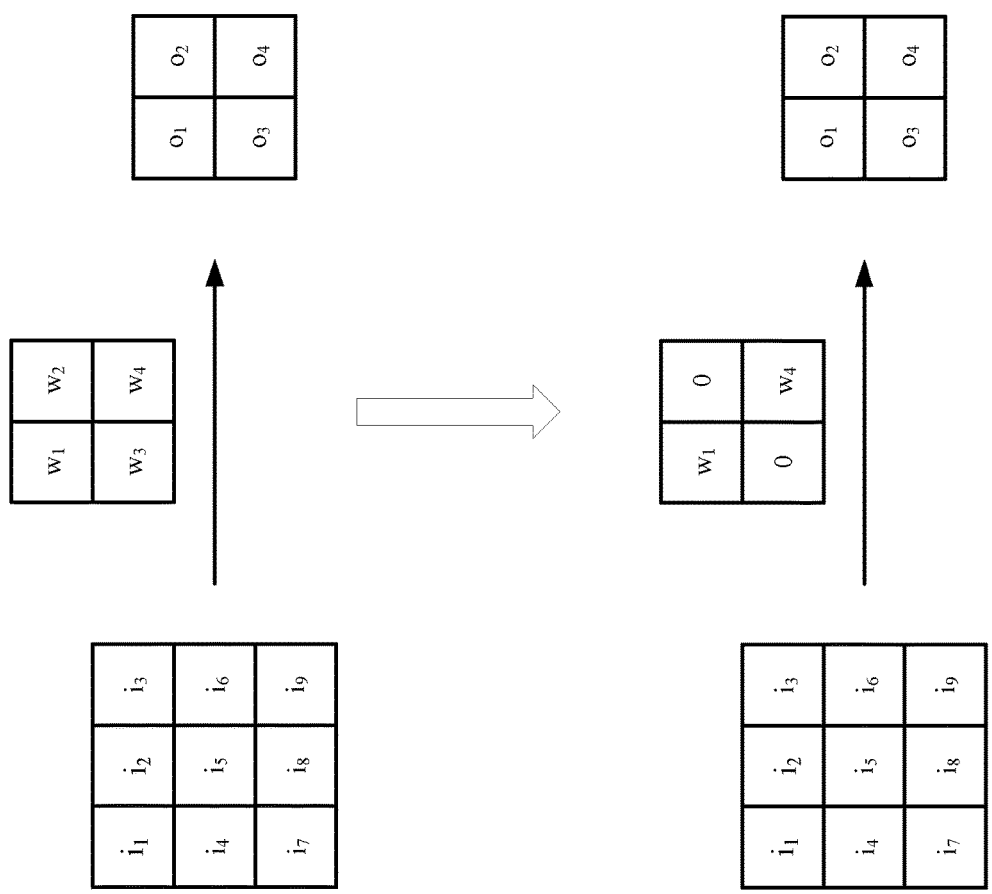
FIG. 6 is a diagram illustrating a convolution process with modified weight values with which data modification for neural networks may be implemented.

FIG. 6 is a diagram illustrating a convolution process with sparse weight matrix with which data modification for neural networks may be implemented. As depicted, the top part of FIG. 6 shows a convolution process between an input matrix and a weight matrix. The lower part of FIG. 6 shows a convolution process between the input matrix and a sparse weight matrix. In the sparse weight matrix, weight values $w_2$ and $w_3$ are deleted. Thus, rather than four times of convolution operations, it only requires two convolution operations to generate the output matrix. Specifically, the connection values $w_{11}$, $w_{21}$, $w_{31}$, and $w_{41}$ may be set to (1, 0, 0, 1) or (0, 2) for the calculation of output data at output nodes $o_1$ and $o_4$.

Figure 7:
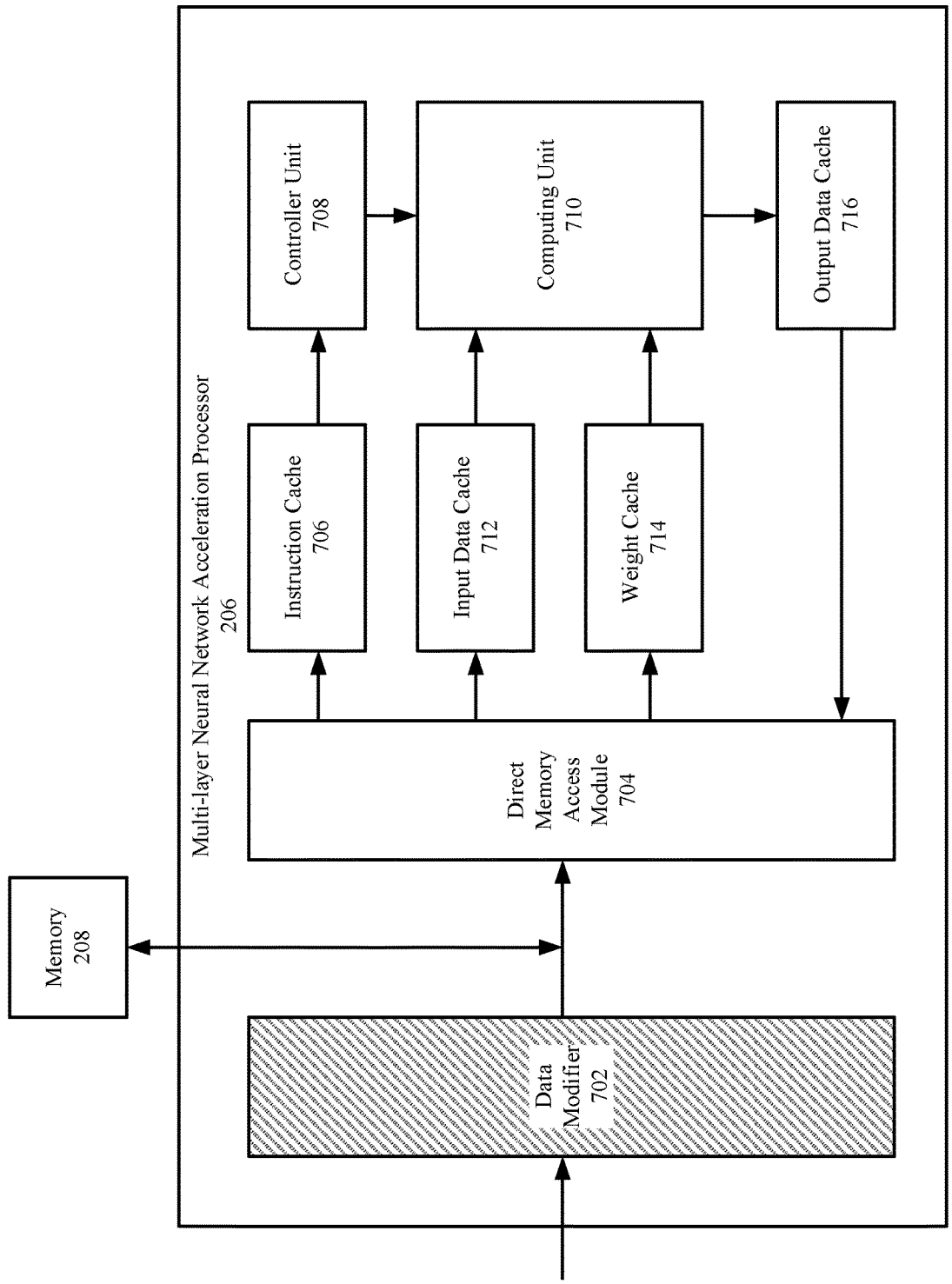
FIG. 7 is a block diagram illustrating an example MNN acceleration processor in which data modification for neural networks may be implemented.

FIG. 7 is a block diagram illustrating an example MNN acceleration processor 206 in which data modification for neural networks may be implemented. As depicted, MNN acceleration processor 206 may at least include a data modifier 702 configured to receive one or more groups of input data and a predetermined weight value array that includes one or more weight values. As described above, the one or more groups of input data may be stored in a form of data array ("input array" hereinafter); that is, each group of the input data may be stored as an element of the input array ("input element" hereinafter). Each input element may be identified by an array index ("input array index" hereinafter; e.g., $i_1$, $i_2$, $i_3$, and $i_4$). Each of the weight values (e.g., $w_{11}$, $w_{21}$, $w_{31}$, and $w_{41}$) may be designated for calculating a group of output data at an output node (e.g., $o_1$) based on a respective group of input data (e.g., a group of input data received at the input node $i_1$). The calculated output data may be similarly stored in a form of data array ("output array" hereinafter); that is, each group of the output data may be stored as an element of the output array ("output element" hereinafter). Each output element may be identified by an array index ("output array index" hereinafter; e.g., $o_1$ and $o_2$).

The data modifier 702 may be configured to further receive connection data that include one or more initial connection values. Each of the initial connection values may correspond to an input array index (e.g., $i_2$) and an output array index (e.g., $o_1$). In the example illustrated in FIG. 4A, the initial connection values respectively for $o_1$ and $o_2$ may be presented as 1111 and 1111. In the example illustrated in FIG. 4B, the initial connection values respectively for $o_1$ and $o_2$ may be presented as 0111 and 0111.

Upon receiving the input data, the weight values, and the initial connection values, the data modifier 702 may be configured to determine whether to prune the input data and/or the weight values. Based on the determination to prune the input data and/or the weight values, the data modifier 702 may be configured to modify the initial connection values in accordance with the input data and/or the weight values.

For example, as illustrated in FIG. 4A, the data modifier 702 may be configured to modify the initial connection values based on the weight values. Since the absolute value of the example weight value $w_{21}$ is less than the first threshold value, the data modifier 702 may be configured to modify the connection values from 1111 to 1011 for the output node $o_1$.

In addition, the data modifier 702 may be configured to further modify the connection values based on the input data. For example, the data modifier 702 may be configured to set a connection value corresponding to an input data, of which the absolute value is less than or equal to a second threshold value, to zero. As shown in FIG. 4A, the dash-lined block $i_1$ may indicate that the absolute value of the input data is less than or equal to a second threshold value. For example, the input data at $i_1$ may be 0.01 and the second threshold value may be 0.3. In this case, the data modifier 702 may be configured to modify the connection values from 1011 to 0011. Notably, in at least some examples, the data modifier 702 may be configured to modify the initial connection values based on the weight values and the input data parallelly. The modification process is described here sequentially merely for the purpose of clarity.

In the example illustrated in FIG. 4B, the data modifier 702 may be similarly configured to modify the connection values based on the weight values. For example, the data modifier 702 may be configured to delete a connection value that corresponds to a weight value less than or equal to a first threshold, e.g., from 0111 to 021. In addition, the data modifier 702 may be configured to further modify the connection values based on the input data. In other words, the data modifier 702 may be configured to delete a connection value that corresponds to an input data, of which an absolute value is less than or equal to a second threshold value. For example, when the absolute value of the input data at $i_1$ is less than the second threshold value, the data modifier 702 may be configured to modify the connection values from 021 to 21.

Further, the data modifier 702 may be configured to modify the input data and the weight values based on the modified connection values.

For example, with respect to output node $o_1$, based on the modified connection values of 0011, the data modifier 702 may be configured to delete the input data corresponding to the connection values of zero, e.g., $i_1$ and $i_2$, and to delete the weight values corresponding to the connection values of zero, e.g., $w_{11}$ and $w_{21}$. Thus, the input data may be modified to be ($i_3$, $i_4$) and the weight values may be modified to be ($w_{31}$, $w_{41}$). In some examples, the data modifier 702 may be configured to output one or more connection pairs. Each connection pair may indicate a correspondence between a group of input data and a weight value. For example, the data modifier 702 may be configured to output two connection pairs, e.g., $i_3$-$w_{31}$, $i_4$-$w_{41}$.

The modified input data and/or the modified weight values in the form of connection pairs may be transmitted to and temporarily stored in an input data cache 712 and/or a weight cache 714. The input data cache 712 and weight cache 714 may refer to one or more high-speed storage devices incorporated within the MNN acceleration processor 206 and configured to store the input data and the weight values respectively. The modified input data and/or the modified weight values may be further transmitted to a computing unit 710 for further processing.

MNN acceleration processor 206 may further include an instruction cache 706 and a controller unit 708. The instruction cache 706 may refer one or more storage devices configured to store instructions received from the CPU 204. The controller unit 708 may be configured to read the instructions from the instruction cache 706 and decode the instructions.

Upon receiving the decoded instructions from the controller unit 708, the modified input data from the input data cache 712, and the modified weight values from the weight cache 714, the computing unit 710 may be configured to calculate one or more groups of output data based on the modified weight values and the modified input data. In some respects, the calculation of the output data may include the forward propagation process and the backward propagation process described in accordance with FIG. 1.

The computing unit 710 may further include one or more multipliers configured to multiply the modified input data by the modified weight values to generate one or more weighted input data, one or more adders configured to add the one or more weighted input data to generate a total weighted value and add a bias value to the total weighted value to generate a biased value, and an activation processor configured to perform an activation function on the biased value to generate a group of output data.

The generated output data may be temporarily stored in an output data cache 716 and may be further transmitted to the memory 208 via the DMA module 704.

Figure 8:
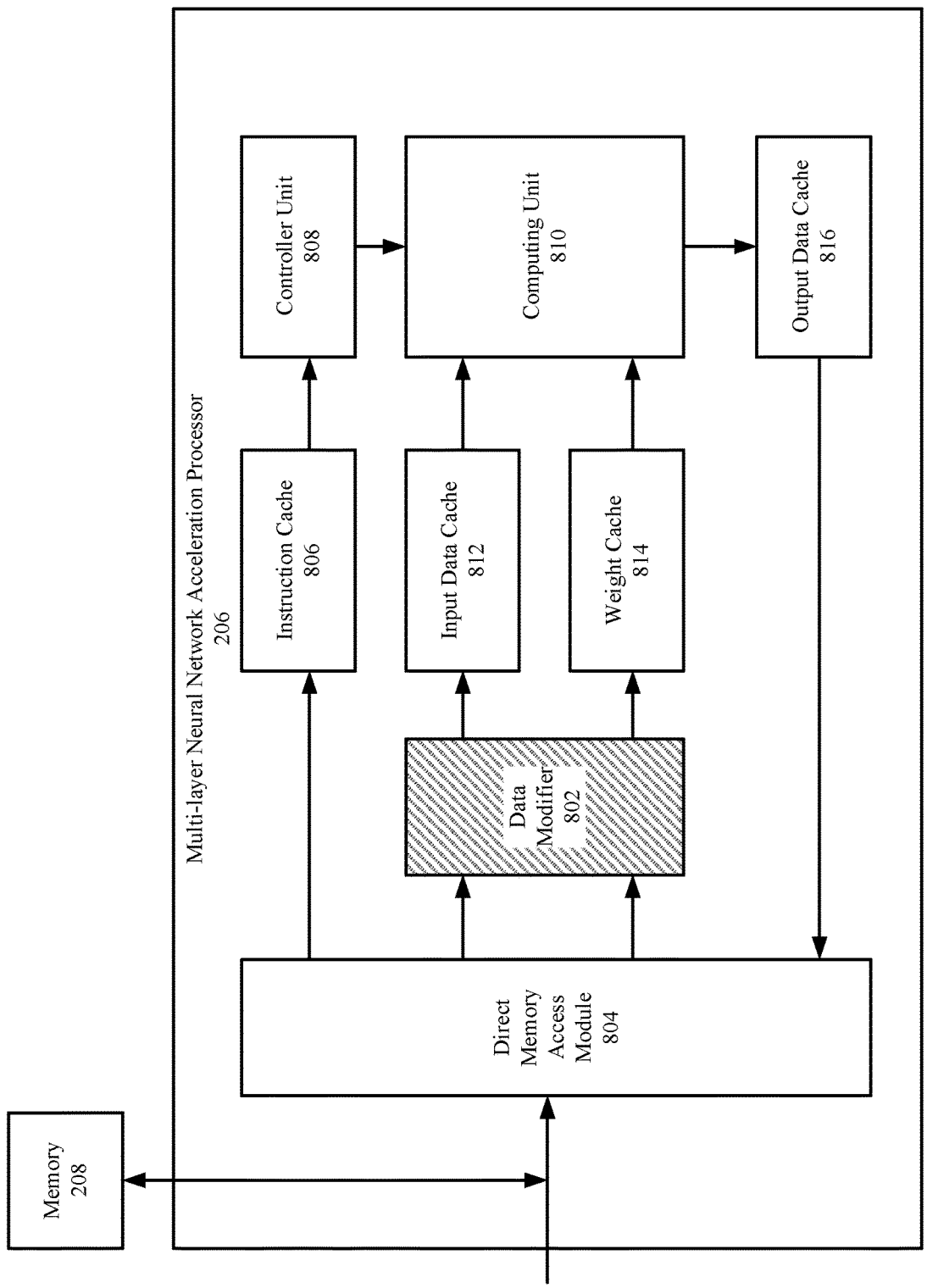
FIG. 8 is a block diagram illustrating another example MNN acceleration processor in which data modification for neural networks may be implemented.

FIG. 8 is a block diagram illustrating another example MNN acceleration processor 206 in which data modification for neural networks may be implemented. As depicted, components in the example MNN acceleration processor 206 may be the same or similar to the corresponding components shown in FIG. 7 or may be configured to perform the same or similar operations to those shown in FIG. 7 except that a data modifier 802 may be implemented between a DMA module 804, an input data cache 812, and a weight cache 814.

The data modifier 802, similar to the data modifier 702, may be configured to modify the connection values and further to modify the input data and the weight values based on the modified connection values. The modified input data and the modified weight values may be transmitted to an input data cache 812 and a weight cache 814 and may be further transmitted to a computing unit 810 for further processing.

Figure 9:
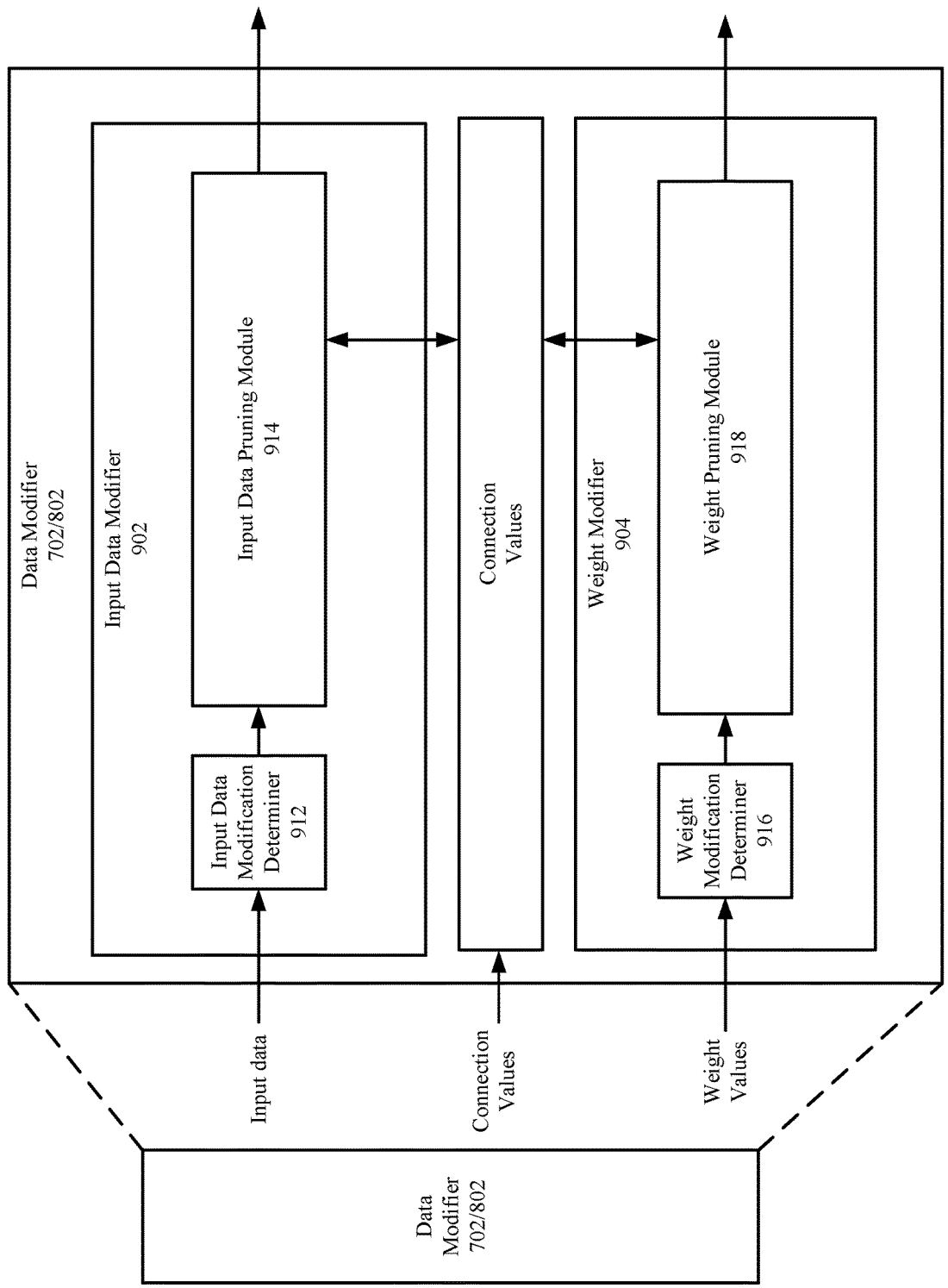
FIG. 9 is a block diagram illustrating an example data modifier by which data modification for neural networks may be implemented.

FIG. 9 is a block diagram illustrating an example data modifier 702/802 by which data modification for neural networks may be implemented. As depicted, the example data modifier 702/802 may include an input data modifier 902 and a weight modifier 904. The input data modifier 902 may be configured to modify the one or more groups of received input data. The weight modifier 904 may be configured to modify the one or more groups of receive weight values.

In more detail, upon receiving one or more groups of input data, an input data modification determiner 912 may be configured to determine whether to prune the received groups of input data. In some examples, the determination may be made by the input data modification determiner 912 based on an instruction to prune the input data. Since pruned input data may lead to less power consumption and lower accuracy, the input data modification determiner 912 may be configured to determine to prune the input data for computation tasks that do not require high accuracy to reduce power consumption.

When the input data modification determiner 912 determines to prune the input data, an input data pruning module 914 of the input data modifier 902 may be configured to modify the initial connection values based on the one or more groups of input data. In the example illustrated in FIG. 4A, one or more groups of input data may be received at input nodes $i_1$, $i_2$, $i_3$, and $i_4$. The receive weight values for output node $o_1$ may be $w_{11}$, $w_{21}$, $w_{31}$, and $w_{41}$. The initial connection values may be 1111. In this example, since the absolute value of the input data at input node $i_1$ is less than or equal to the second threshold value, the input data pruning module 914 may be configured to set the connection value corresponding to the input data at input node $i_1$ as zero. Thus, the initial connection values may be modified to be 0111.

Similarly, upon receiving one or more weight values, a weight modification determiner 916 may be configured to determine whether to prune the receive weight values. The determination may be made by the weight modification determiner 916 based on an instruction in at least some examples.

When the weight modification determiner 916 determine to prune the weight values, a weight pruning module 918 of the weight modifier 904 may be configured to modify the connection values based on the receive weight values. For example, the weight pruning module 918 may be configured to set a connection value corresponding to a weight value, of which the absolute value is less than or equal to a first threshold value, to zero. Further to the example illustrated in FIG. 4A, since the absolute value of the weight value $w_{21}$ is less than the first threshold value, the weight pruning module 918 may be configured to set the connection value that corresponds to $w_{21}$ to zero. Thus, the connection values may be further modified by the weight pruning module 918 from 0111 to 0011.

As the modified connection values for output node of is modified to be 0011, the input data pruning module 914 and the weight pruning module 918 may be configured to only output input data and weight value indicated by the modified connection values, e.g., ($i_3$, $i_4$) and ($w_{31}$, $w_{41}$). In some examples, the data modifier 702/802 may be configured to output one or more connection pairs. Each connection pair may indicate a correspondence between a group of input data and a weight value. For example, the data modifier 702/802 may be configured to output two connection pairs, e.g., $i_3$-$w_{31}$, $i_4$-$w_{41}$.

Figure 10:
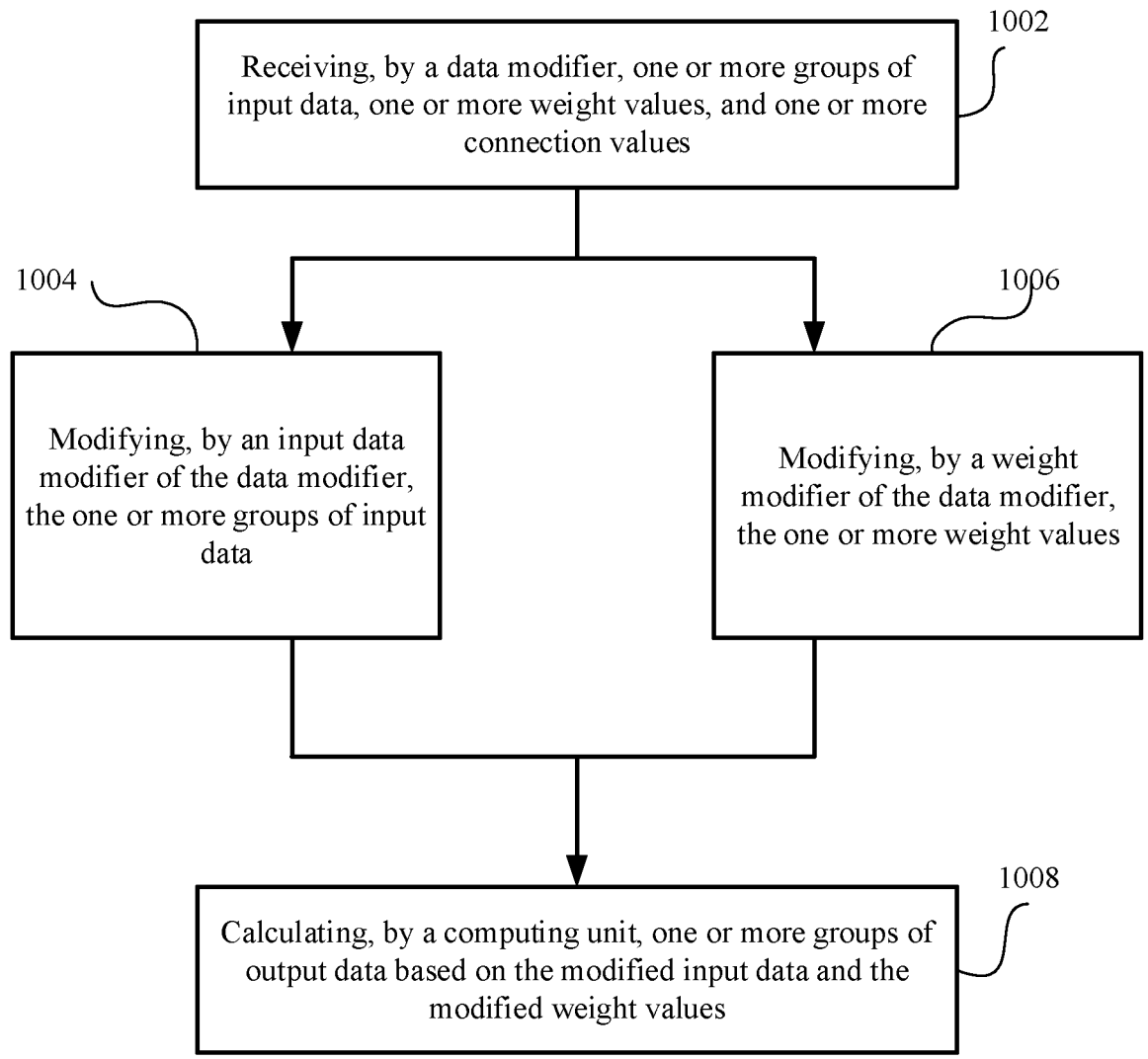
FIG. 10 is a flow chart of aspects of an example method for modifying data for neural networks.

FIG. 10 is a flow chart of aspects of an example method 1000 for modifying data for neural networks. The example method 1000 may be performed by one or more components of the MNN acceleration processor 206 as described in FIGS. 7 and 8 and the components of the data modifier 702/802 as described in FIG. 9.

At block 1002, the example method may include receiving, by a data modifier, one or more groups of input data, one or more weight values, and one or more connection values. For example, the data modifier 702/802 may be configured to one or more groups of input data and a predetermined weight value array that includes one or more weight values. Each group of the input data may be stored as an element of the input array. Each input element may be identified by an array index (e.g., $i_1$, $i_2$, $i_3$, and $i_4$). Each of the weight values (e.g., $w_{11}$, $w_{21}$, $w_{31}$, and $w_{41}$) may be designated for calculating a group of output data at an output node (e.g., $o_1$) based on a respective group of input data (e.g., a group of input data received at the input node $i_1$). Further, the data modifier 702/802 may also receive connection data that include one or more initial connection values. Each of the initial connection values may correspond to an input array index (e.g., $i_2$) and an output array index (e.g., $o_1$).

At block 1004, the example method may include modifying, by an input data modifier of the data modifier, the one or more groups of input data. For example, the input data pruning module 914 of the input data modifier 902 may be configured to modify the initial connection values based on the one or more groups of input data. In the example illustrated in FIG. 4A, one or more groups of input data may be received at input nodes $i_1$, $i_2$, $i_3$, and $i_4$. The receive weight values for output node $o_1$ may be $w_{11}$, $w_{21}$, $w_{31}$, and $w_{41}$. The initial connection values may be 1111. In this example, since the absolute value of the input data at input node $i_1$ is less than or equal to the second threshold value, the input data pruning module 914 may be configured to set the connection value corresponding to the input data at input node $i_1$ as zero. Thus, the initial connection values may be modified to be 0111. Operation at block 1004 may be performed parallelly to the operation at block 1006.

At block 1006, the example method may include modifying, by a weight modifier of the data modifier, the one or more weight values. For example, the weight pruning module 918 of the weight modifier 904 may be configured to modify the connection values based on the receive weight values. For example, the weight pruning module 918 may be configured to set a connection value corresponding to a weight value, of which the absolute value is less than or equal to a first threshold value, to zero. Further to the example illustrated in FIG. 4A, since the absolute value of the weight value $w_{21}$ is less than the first threshold value, the weight pruning module 918 may be configured to set the connection value that corresponds to $w_{21}$ to zero. Thus, the connection values may be further modified by the weight pruning module 918 from 0111 to 0011.

As the modified connection values for output node of is modified to be 0011, the input data pruning module 914 and the weight pruning module 918 may be configured to only output input data and weight value indicated by the modified connection values, e.g., ($i_3$, $i_4$) and ($w_{31}$, $w_{41}$). In some examples, the data modifier 702/802 may be configured to output one or more connection pairs. Each connection pair may indicate a correspondence between a group of input data and a weight value. For example, the data modifier 702/802 may be configured to output two connection pairs, e.g., $i_3$-$w_{31}$, $i_4$-$w_{41}$.

At block 1008, the example method may include calculating, by a computing unit, one or more groups of output data based on the modified input data and the modified weight values. For example, the computing unit 710 may be configured to calculate one or more groups of output data based on the modified weight values (e.g., ($w_{31}$, $w_{41}$)) and the modified input data (e.g., ($i_3$, $i_4$)). Thus, the multiplication by the computing unit 710 may become a simpler operation (e.g., $i_3*w_{31}+i_4*w_{41}$) than the original multiplication between ($i_1$, $i_2$, $i_3$, $i_4$) and ($w_{11}$, $w_{21}$, $w_{31}$, $w_{41}$).

The process or method described in the above accompanying figures can be performed by process logic including hardware (for example, circuit, specific logic etc.), firmware, software (for example, a software being externalized in a non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. An apparatus for modifying data for neural networks, comprising:
   a data modifier circuit configured to receive one or more groups of input data, one or more weight values, and one or more connection values,
   wherein the data modifier circuit includes:
      an input data modifier circuit configured to modify the connection values in accordance with the one or more groups of input data, wherein the input data modifier circuit further includes an input data pruning circuit,
      wherein the input data pruning circuit is configured to:
         identify at least one of the one or more groups of input data, absolute values of which are less than or equal to a first threshold value,
         identify at least one of the one or more connection values that correspond to the identified at least one of the one or more groups of input data, and
         set the identified at least one of the one or more connection values to zero, and
   a weight modifier circuit configured to further modify the connection values in accordance with the one or more weight values to generate modified connection values,
      wherein the input data modifier circuit is configured to modify the one or more groups of input data according to the modified connection values and the weight modifier circuit is configured to modify the one or more weight values according to the modified connection values; and
   a computing circuit configured to calculate one or more groups of output data based on the modified input data and the modified weight values.

2. The apparatus of claim 1, wherein the input data pruning circuit is further configured to delete at least one of the one or more groups of input data based on the modified connection values.

3. The apparatus of claim 1, wherein the input data pruning circuit is further configured to set each of the one or more connection values to a value equal to a distance between a current group of input data and a previous group of input data.

4. The apparatus of claim 1, wherein the input data modifier circuit includes an input data modification determiner circuit configured to determine whether to prune the one or more groups of input data.

5. The apparatus of claim 1,
   wherein the weight modifier circuit further includes a weight pruning circuit configured to modify the connection values in accordance with the one or more weight values,
   wherein the weight pruning circuit is further configured to set at least one of the one or more connection values to zero,
   wherein the at least one of the one or more connection values correspond to at least one of the one or more weight values, and
   wherein absolute values of the at least one of the one or more weight values are less than or equal to a second threshold value.

6. The apparatus of claim 5, wherein the weight pruning circuit configured to delete at least one of the one or more weight values based on the modified connection values.

7. The apparatus of claim 1, wherein the weight modifier circuit includes a weight modification determiner circuit configured to determine whether to prune the one or more weight values.

8. The apparatus of claim 1, wherein the data modifier circuit is further configured to generate one or more connection pairs based on the modified groups of input data and the modified weight values, wherein each of the one or more connection pairs indicates a correspondence between one of the one or more groups of input data and one of the one or more weight values.

9. A method for modifying data for neural networks, comprising:
   receiving, by a data modifier circuit, one or more groups of input data, one or more weight values, and one or more connection values;
   modifying, by an input data modifier circuit of the data modifier circuit, the connection values in accordance with the one or more groups of input data; wherein the modifying of the connection values includes:
      identifying, by an input data pruning circuit of the input data modifier circuit, at least one of the one or more groups of input data, absolute values of which are less than or equal to a first threshold value,
      identifying, by the input data pruning circuit of the input data modifier circuit, at least one of the one or more connection values that correspond to the identified at least one of the one or more groups of input data, and
      setting, by the input data pruning circuit of the input data modifier circuit, the identified at least one of the one or more connection values to zero;
   further modifying, by a weight modifier circuit of the data modifier circuit, the connection values in accordance with the one or more weight values to generate modified connection values;
   modifying, by the input data modifier circuit, the one or more groups of input data according to the modified connection values;
   modifying, by the weight modifier circuit, the one or more weight values according to the modified connection values; and
   calculating, by a computing circuit, one or more groups of output data based on the modified input data and the modified weight values.

10. The method of claim 9, further comprising setting, by the input data pruning circuit, each of the one or more connection values to a value equal to a distance between a current group of input data and a previous group of input data.

11. The method of claim 9, further comprising deleting, by the input data pruning circuit, at least one of the one or more groups of input data based on the modified connection values.

12. The method of claim 9, further comprising determining, by an input data modification determiner circuit of the input data modifier circuit, whether to prune the one or more groups of input data.

13. The method of claim 9, further comprising modifying, by a weight pruning circuit of the weight modifier circuit, the connection values in accordance with the one or more weight values.

14. The method of claim 13, further comprising setting, by the weight pruning circuit, at least one of the one or more connection values to zero, wherein the at least one of the one or more connection values correspond to at least one of the one or more weight values, wherein absolute values of the at least one of the one or more weight values are less than or equal to a second threshold value.

15. The method of claim 13, further comprising deleting, by the weight pruning circuit, at least one of the one or more weight values based on the modified connection values.

16. The method of claim 9, further comprising generating, by the data modifier circuit, one or more connection pairs based on the modified groups of input data and the modified weight values, wherein each of the one or more connection pairs indicates a correspondence between one of the one or more groups of input data and one of the one or more weight values.

17. The method of claim 9, further comprising determining, by a weight modification determiner circuit of the weight modifier circuit, whether to prune the one or more weight values.

* * * * *